US011702790B2

(12) United States Patent
Papsdorf et al.

(10) Patent No.: US 11,702,790 B2
(45) Date of Patent: Jul. 18, 2023

(54) MOVEABLE LAUNDRY TREATMENT APPARATUS

(71) Applicant: The Procter & Gamble Company, Cincinnati, OH (US)

(72) Inventors: Clifford Theodore Papsdorf, Loveland, OH (US); Scott Eugene Mizer, Loveland, OH (US); Mark Neil Howdyshell, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 94 days.

(21) Appl. No.: 17/530,667

(22) Filed: Nov. 19, 2021

(65) Prior Publication Data

US 2022/0162793 A1    May 26, 2022

(30) Foreign Application Priority Data

Nov. 20, 2020    (EP) .................................... 20208817

(51) Int. Cl.
| | |
|---|---|
| *D06F 39/12* | (2006.01) |
| *D06F 23/06* | (2006.01) |
| *D06F 39/00* | (2020.01) |
| *D06F 23/02* | (2006.01) |
| *B60B 33/00* | (2006.01) |
| *B60B 33/04* | (2006.01) |

(52) U.S. Cl.
CPC ............ *D06F 39/125* (2013.01); *D06F 23/02* (2013.01); *D06F 23/06* (2013.01); *D06F 39/001* (2013.01); *B60B 33/0092* (2013.01); *B60B 33/04* (2013.01); *B60B 2200/20* (2013.01)

(58) Field of Classification Search
CPC ........ D06F 23/02; D06F 23/06; D06F 39/001; D06F 39/125; B60B 2220/20
See application file for complete search history.

(56) References Cited

U.S. PATENT DOCUMENTS

| | | | | |
|---|---|---|---|---|
| 2,048,608 A | * | 7/1936 | Holland ................ | D06F 39/125 248/167 |
| 2,579,309 A | * | 12/1951 | Dunham ................. | D06F 23/02 74/572.4 |

(Continued)

FOREIGN PATENT DOCUMENTS

| | | | | | |
|---|---|---|---|---|---|
| CN | 109411252 A | * | 3/2019 | ........... | D06F 39/001 |
| CN | 114075764 A | * | 2/2022 | ........... | D06F 39/125 |
| DE | 3937230 A1 | * | 5/1991 | ........... | D06F 39/125 |

(Continued)

OTHER PUBLICATIONS

Electronic translation of CN-109411252-A. (Year: 2019).*

(Continued)

*Primary Examiner* — Joseph L. Perrin
(74) *Attorney, Agent, or Firm* — Gary J. Foose

(57) ABSTRACT

A laundry treatment apparatus including a plurality of swivel casters. Two of the swivel casters are braked swivel casters. One of the swivel casters other than the braked swivel casters is a vertically adjustable swivel caster. The braked swivel casters restrain translational movement of the laundry treatment apparatus across a floor. The vertically adjustable swivel caster can help fix the position of the laundry treatment apparatus so as to restrain rocking and twisting of the laundry treatment apparatus.

20 Claims, 4 Drawing Sheets

(56) References Cited

U.S. PATENT DOCUMENTS 2,918,812 A * 12/1959 Ohmann ............... D06F 39/125
16/39
3,884,493 A * 5/1975 Weir ................... B60B 33/0002
16/35 R

FOREIGN PATENT DOCUMENTS

DE            19651291 A1    6/1998
GB             1160274 A     8/1969

OTHER PUBLICATIONS

Electronic translation of DE-3937230-A1. (Year: 1991).*
Electronic translation of CN-114075764-A. (Year: 2022).*
PCT Search Report and Written Opinion for PCT/US2021/072417 dated Mar. 31, 2022; 12 pages.
Extended European Search Report and Written Opinion for 20208817. 5, dated May 27, 2021; 07 pages.

* cited by examiner

MOVEABLE LAUNDRY TREATMENT APPARATUS

FIELD OF THE INVENTION

Moveable laundry treatment apparatus.

BACKGROUND OF THE INVENTION

Many residents of urban dwellings are confronted with the problem of accomplishing the same household chores as their suburban counterparts in a fraction of the living space. One way that residents of urban dwellings deal with this challenge is to maintain some flexibility in how they use their limited living space. For example, the bedroom may become the home office on days when a person works from home. Or the living room becomes the spare bedroom when guests need to be accommodated. Or the kitchen or bathroom becomes the laundry room when laundry needs to be done.

Not all urban dwellings have a dedicated space for doing laundry. Due to convenience, many residents do their laundry in the kitchen or bathroom. Depending on the era in which the dwelling was built, there may or may not be dedicated plumbing or floor cabinet space for a washing machine. If a built in washing machine is not available and an adequate shared laundry room, laundromat, or laundry service is not available to the residents, residents may choose to use a stow away washing machine. Such washing machines tend to be small so that a person can move the machine into the room in which it will be used and then conveniently move the machine back into storage when the machine is not in use.

Washing machines have a rotatable drum disposed within a stationary tub. The drum may be mounted on a horizontal or vertical axis. During the operation cycle of the washing machine, the drum may rotate about the axis. When the laundry is wet and unevenly distributed within the drum, the imbalance of mass within the drum can result in vibrations that generate appreciable forces and may cause the washing machine to move.

Stow away washing machines may be provided with one or more wheels to more conveniently enable moving. In use, the washing machine may rest on one or more of the wheels and one or more feet of the washing machine. To roll away the washing machine, the user lifts one edge of the washing machine to lift the foot of the washing machine so that the weight of the washing machine is carried by the one or more wheels and the use pushes or pulls the washing machine. A hand hold or handle may be provided to make lifting and pushing or pulling more convenient. The one or more wheels may have brakes to help restrain rolling of the wheels, thereby restraining movement of the washing machine in use. Optionally, the one or more wheels can be retractable so that the washing machine can rest on a footprint having a bigger area to limit movement of the washing machine in use.

The floors of many urban dwellings are not precisely level. This can make it challenging for the resident to find a place at which the washing machine can rest stably while the washing machine is operated. If the washing machine is not sufficiently level, the washing machine may move laterally during operation. For large washing machines that are designed to remain in one position within a room, the washing machine is typically leveled by adjusting four leveling feet. The leveling feet are typically attached to threaded screws that can be screwed in or out of a frame to alter the position of an individual leveling foot. The leveling feet are at the bottom of the machine. This solution is not practical for stow away washing machines since the user finds it inconvenient to adjust multiple screws at floor level beneath a somewhat heavy washing machine every time the washing machine is moved into the room in which the washing machine will be used.

With these limitations in mind, there is a continuing unaddressed need for a mechanism that can be easily operated to level and stabilize a stow away washing machine when the washing machine is moved into position for use.

SUMMARY OF THE INVENTION

A laundry treatment apparatus (1) comprising: an apparatus base (10) having four corners (15); a tub (40) defining a fluid containment envelope (50), wherein the tub is above the apparatus base; a drum (60) positioned within the tub and rotatable relative to the tub about an axis of rotation (AR) that is within about 20 degrees of horizontal relative to the apparatus base; a first pair (70) of first swivel casters (75) operably engaged with the apparatus base, wherein each first swivel caster operably supports one of the four corners; a second pair (80) of second swivel casters (85) opposite the first pair and operably engaged with the apparatus base, wherein each the second swivel caster supports one of the four corners independent of the first swivel casters; wherein one of the first swivel casters is a braked first swivel caster (77) having a first rolling brake (184); wherein one of the second swivel casters is a braked second swivel caster (87) having a second rolling brake (186); wherein one of the second swivel casters other than the braked second swivel caster is a vertically adjustable swivel caster (89) wherein a wheel (190) of the vertically adjustable swivel caster is movable in a direction towards and away from the apparatus base; wherein the vertically adjustable swivel caster comprises a lock (230) engageable to restrain movement of the vertically adjustable swivel caster in a direction towards and away from the apparatus base; wherein the first rolling brake is operably engaged to an actuator (90) by a first linkage (92), the second rolling brake is connected to the actuator by a second linkage (94), and the lock is connected to the actuator by a third linkage (96); wherein the first linkage, the second linkage, and said third linkage each have a first position in which said first rolling brake and said second rolling brake are unbraked and said lock is unlocked; and wherein said first linkage, said second linkage, and said third linkage each have a second position in which said first rolling brake and said second rolling brake are braked and said lock is locked to restrain movement of said vertically adjustable swivel caster in a direction towards and away from said apparatus base; wherein said first pair of swivel casters and one of said second swivel casters other than said vertically adjustable swivel caster define a plane upon which said apparatus base rests and said vertically adjustable swivel caster supports said plane.

DETAILED DESCRIPTION OF THE INVENTION

Figure 1:
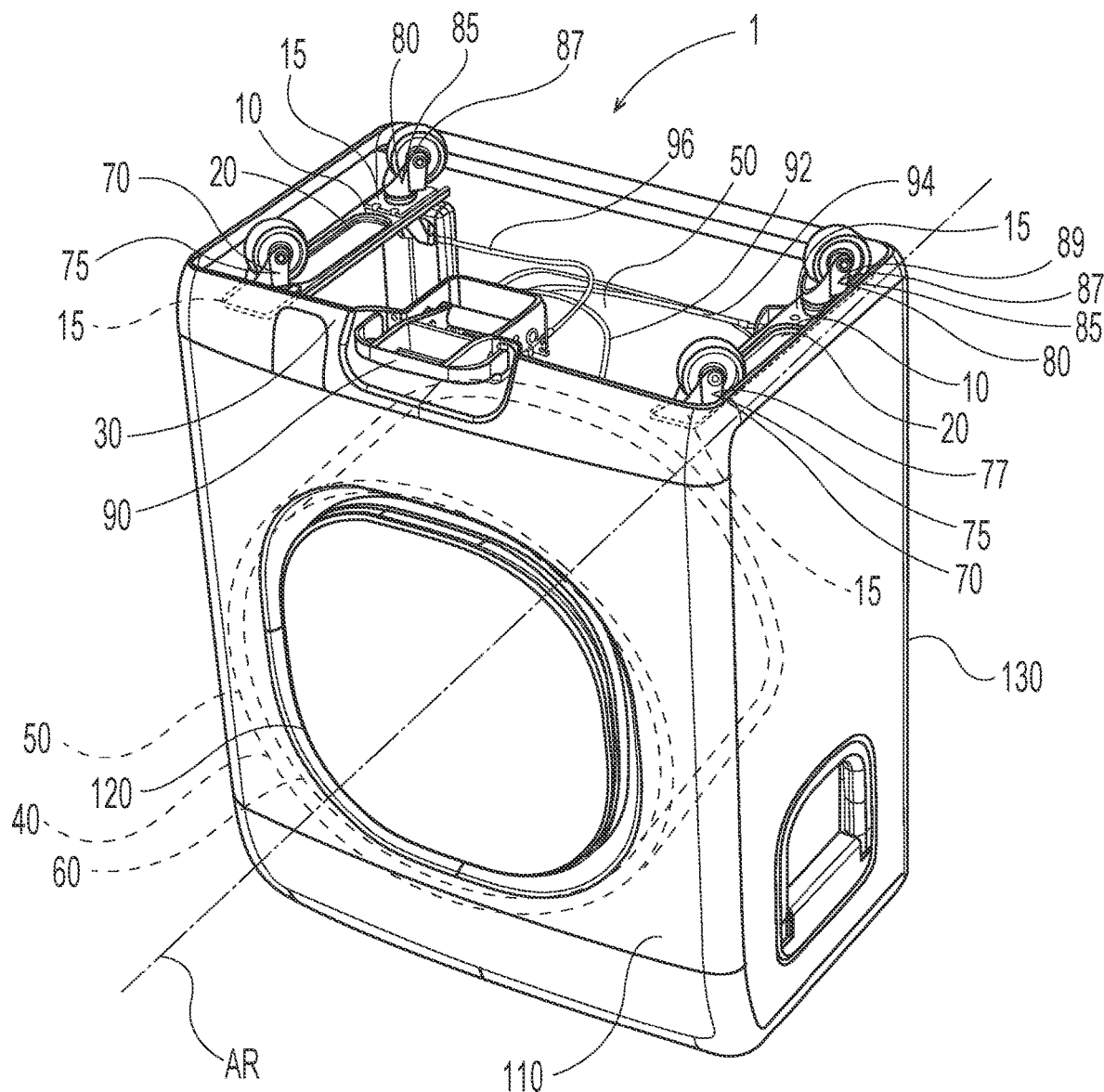
FIG. 1 is a laundry treatment apparatus shown in an upside-down position.

A laundry treatment apparatus 1 is shown in FIG. 1. The laundry treatment apparatus 1 is shown in an upside-down position since certain features of the laundry treatment apparatus 1 are located one the bottom of the laundry treatment apparatus. The laundry treatment apparatus 1 can be front loading or top loading laundry treatment apparatus 1. For user efficiency, a front loading laundry treatment apparatus 1 can be practical. The laundry treatment apparatus 1 can be provided to be conveniently moveable so that the user can move the laundry treatment apparatus 1 to difference locations within a dwelling.

A laundry treatment apparatus 1 has a few basic components. First, the laundry treatment apparatus 1 has an apparatus base 10. The apparatus base 10 can be a pair of skids 20, by way of nonlimiting example, as shown in FIG. 1, to which the internal frame of the laundry treatment apparatus 1 is mounted. Optionally the apparatus base 10 can be the bottom or a part of the frame that supports other components of the laundry treatment apparatus 1 or part of the external shell 30 of the laundry treatment apparatus 1. The apparatus base 10 can have four corners 15. The four corners 15 can define a square, rectangle, trapezoid, or other four sided polygon that is practical for supporting the apparatus base 10 of a laundry treatment apparatus 1.

Above the apparatus base 10, the laundry treatment apparatus 1 can comprise a tub 40 defining a fluid containment envelope 50. Within the tub 40, a drum 60 can be positioned. The drum 60 can be rotatable relative to the tub 40 about an axis of rotation AR. The axis of rotation AR can be within about 20 degrees of horizontal relative to the apparatus base 10. An axis of rotation AR that is tipped slightly relative to horizontal can be ergonomic for users to reach in and out of the laundry treatment apparatus 1 and can help provide for stability of the laundry treatment apparatus 1 when the drum 60 contains laundry articles and is rotating. The axis of rotation AR can be within about 20 degrees, or within about 10 degrees, or within about 5 degrees above horizontal relative to the apparatus base 10. The axis of rotation AR can be horizontal relative to the apparatus base 10.

The tub 40 contains the drum 60. The drum 60 can have porous walls so that laundry treatment liquor, wetting water, and rinse water, can be added and removed from the tub 40. The drum 60 can have a volume from about 20 L to about 70 L. A laundry treatment apparatus 1 having such a small drum 60 can be readily moveable about a user's dwelling by rolling it around on its swivel casters.

The laundry treatment apparatus 1 can comprise a first pair 70 of first swivel casters 75 operably engaged with the apparatus base 10. Each first swivel caster 75 can operably support one of the four corners 15. The first pair 70 of first swivel casters 75 can be positioned at the front, a side, or the rear of the apparatus base 10.

A second pair 80 of second swivel casters 85 can be provided opposite the first pair 70 and operably engaged with the apparatus base 10. Each of the second swivel casters 85 can support one of the four corners 15 independent of the first swivel casters 75. The second pair 80 of second swivel casters 85 can be positioned at the front, or the rear, or a side of the apparatus base 10. In describing the pairs of swivel casters, a particular named pair of swivel casters is not specified as being at a particular location since it is not critical if the particular named pair is at the front, rear, or one of the sides of the laundry treatment apparatus 1. Rather, together, the pairs of swivel casters define two of the edges of a polygon defined by four swivel casters.

The swivel casters can include polymer wheels for quiet and non-marking rolling on various common floor surfaces, such as tile, vinyl, wood, carpet, composite laminate, cork, and the like. Wheels can be made from polypropylene, polyurethane, acetal, and the like. The wheels of the swivel caster can have a diameter from about 3 cm to about 8 cm. The height of the swivel caster can be from about 4 cm to about 20 cm. The frame and plate of the swivel caster can be made of stamped metal such as plated steel or stainless steel. Optionally the frame and plate of the swivel caster can be injection molded plastic.

In operation, the laundry treatment apparatus 1 may vibrate as the drum 60 rotates. Vibration may be induced by a slight or gross imbalance of the load of laundry within the drum 60 during operation of the laundry treatment apparatus 1. Depending on the nature of the imbalance, the laundry treatment apparatus 1 may tend to move in translation across the floor during operation, move about via twisting, or move in some combination of translation and twisting. To help restrain such tendency to move, it can be practical to employ one or more braked swivel casters. The brake of a swivel caster can resist rolling rotation of the swivel caster. A braked swivel caster resists translational movement of the laundry treatment apparatus 1 by way of the friction force between the part of swivel caster in contact with the floor and the floor.

One of the first swivel casters 75 can be a braked first swivel caster 77 having a first rolling brake. Likewise, one of the second swivel casters 85 can be a braked second swivel caster 87 having a second rolling brake. Together, the two braked swivel casters can resist translation of the laundry treatment apparatus 1 across the floor during use. The two braked swivel casters can be located at a side, or front, or rear of the laundry treatment apparatus 1. Optionally, the braked swivel casters can be located at opposite sides of the laundry treatment apparatus 1. Optionally, one of the braked swivel casters can be located at the front of the laundry treatment apparatus 1 and the other can be located at the rear of the laundry treatment apparatus.

Based on an assumption that it may be desirable for each of the swivel casters to support an equal fraction of the weight of the laundry treatment apparatus 1 while the laundry treatment apparatus 1 is in use, there is a mechanical advantage to providing the braked swivel casters diagonally opposite one another as compared to having both braked swivel casters in a single pair of swivel casters. Assuming a square footprint of equally vertically loaded and equally sized swivel casters, braked swivel casters that are diagonally opposite one another can provide 1.4 times as great a friction force to twisting of the laundry treatment apparatus 1 as compared to braked swivel casters that are in a single pair of swivel casters. The braked second swivel caster 87 can be diagonally opposite the braked first swivel caster 77.

One of the second swivel casters 85 other than the braked second swivel caster 87 can be a vertically adjustable swivel caster 89. A vertically adjustable swivel caster 89 is movable in a direction towards and away from the apparatus base 10. That movability is beyond movement that will occur under the self-weight of the laundry treatment apparatus 1. The vertically adjustable swivel caster 89 can be movable over a range of from about 0.5 mm to about 50 mm towards and away from the apparatus base 10. Employing a vertically adjustable swivel caster 89 is practical for helping to stabilize the laundry treatment apparatus 1 when the floor upon which such device rests is uneven. Three swivel casters that are fixed vertically can support the base 10 and the vertically adjustable swivel caster 89 can move either up or down to meet the floor so that all four swivel casters are in contact with the uneven floor. From a stability perspective, having four swivel casters support the base 10 is better than having only three swivel casters supporting the base. If only three swivel casters support the base 10 and the floor is not level, the laundry treatment apparatus 1 can be prone to rocking during use. Rocking can induce transverse movement of the laundry treatment apparatus 1 across the floor. Translation of the laundry treatment apparatus 1 in use is undesirable since the laundry treatment apparatus 1 is connected to a power source, a water source, and drain line during use. Excessive movement of the laundry treatment apparatus 1 may place undue stress or interfere with the operation of one or more of these connections.

To more firmly stabilize the laundry treatment apparatus 1, the vertically adjustable swivel caster 89 can comprise a lock engageable to restrain movement of the vertically adjustable swivel caster 89 in a direction towards and away from the apparatus base 10.

When the laundry treatment apparatus 1 is positioned for use, the three swivel casters other than the vertically adjustable swivel caster 89 sit on the floor and the vertically adjustable swivel caster 89 can move down to meet the floor or up to accommodate a relatively elevated portion of the floor beneath the vertically adjustable swivel caster 89. The lock can be actuated to fix the vertical position of the vertically adjustable swivel caster 89. With the vertical position of the vertically adjustable swivel caster 89 locked, the laundry treatment apparatus 1 rests on four firmly positioned swivel casters, which can resist translational and twisting or rocking movement of the laundry treatment apparatus 1 during use. The first pair 70 of swivel casters and one of the second swivel casters 80 other than the vertically adjustable swivel casters 89 define a plane upon which the apparatus base 10 rests and the vertically adjustable swivel caster 89 supports the plane.

The first rolling brake can be operably engaged to an actuator 90 by a first linkage 92. And the second rolling brake is connected to the actuator 90 by a second linkage 94. And the lock is connected to the actuator 90 by a third linkage 96. The linkages can be a mechanical connection between the actuator and the respective element. For instance, a linkage can be a cable connection. The linkage can be a single bar. The linkage can be one or more bars connected to one another via pins or camming systems. The linkage can be a belt. The linkage can be a chain. The linkages can be an electronic linkage. For example, the linkage may convey power to a motor or a signal to activate a motor from the actuator 90 to move the brake and or lock from a first position to a second position. The linkages can be a combination of mechanical and electronic linkages. For example, the actuator 90 may be mechanically or electronically actuated which generates a signal or connects a circuit that causes an electromechanical device at the terminus of the linkage to engage or disengage the brake and or lock. The linkage can convey mechanic force, a signal, or power, or combinations thereof from the actuator 90 to the brake and or lock to activate or deactivate the brake or lock. The actuator can be a button that the user presses. By pressing the button, the user can activate an electronic device or electromechanical device or wireless device that operates the various brakes and lock. Similarly, the actuator can be a touchscreen or portion of a touch screen used to operate the laundry treatment apparatus 1. The user can input an instruction to the laundry treatment apparatus 1 via a touchscreen to operate the various brakes and lock, possibly remotely or wirelessly or via an electromechanical device.

The linkages can be cable linkages 97. A cable linkage 97 typically includes a cable 98 that is slidable within a cable housing 99. The cable housing 99 is restrained at both ends of the cable housing 99 and the cable 98 can be moved within the cable housing 99, for example by actuating the actuator 90. Such an arrangement is commonly employed for brake systems, throttle systems, derailleur systems for shifting gears, and the like. The cable 98 carriers the mechanical force that acts to engage or disengage the brakes and or lock.

The terminus of a linkage is the element being disengaged or engaged by that linkage. The origin of a linkage is the actuator for that linkage. Disengaged and engaged define two positions, a first position and a second position, respectively. For a rolling brake, the first position is unbraked and the second position is braked. For a lock, the first position is unlocked and the second position is locked. The user can move the laundry treatment apparatus 1 conveniently when the brakes are in an unbraked condition or first position. The lock of the vertically adjustable swivel caster 89 can be unlocked when the brakes are in the unbraked condition or first position. Once the user has positioned the laundry treatment apparatus 1 in a position for use, the user can operate the actuator 90 to transition the relevant linkages to the second position in which the relevant rolling brakes are braked and the lock is locked.

The laundry treatment apparatus can have a front face 110 through which the drum 60 is accessed by a user. The front face 110 may include a hinged door 120 that can be open and closed to provide access to the interior of the drum 60. A rear face 130 can be opposite the front face 110. The vertically adjustable swivel caster 89 can be positioned nearer to the rear face 130 than the front face 110. That is, the vertically adjustable swivel caster 89 can support the rear of the base 10 or the rear of the laundry treatment apparatus 1. It can be practical to locate the vertically adjustable swivel caster 89 towards the rear of the base because it is common for the warp in floors to be greater near the connections between the joists and the header than away from the headers. And the headers are commonly located beneath a wall of the dwelling.

Figure 2:
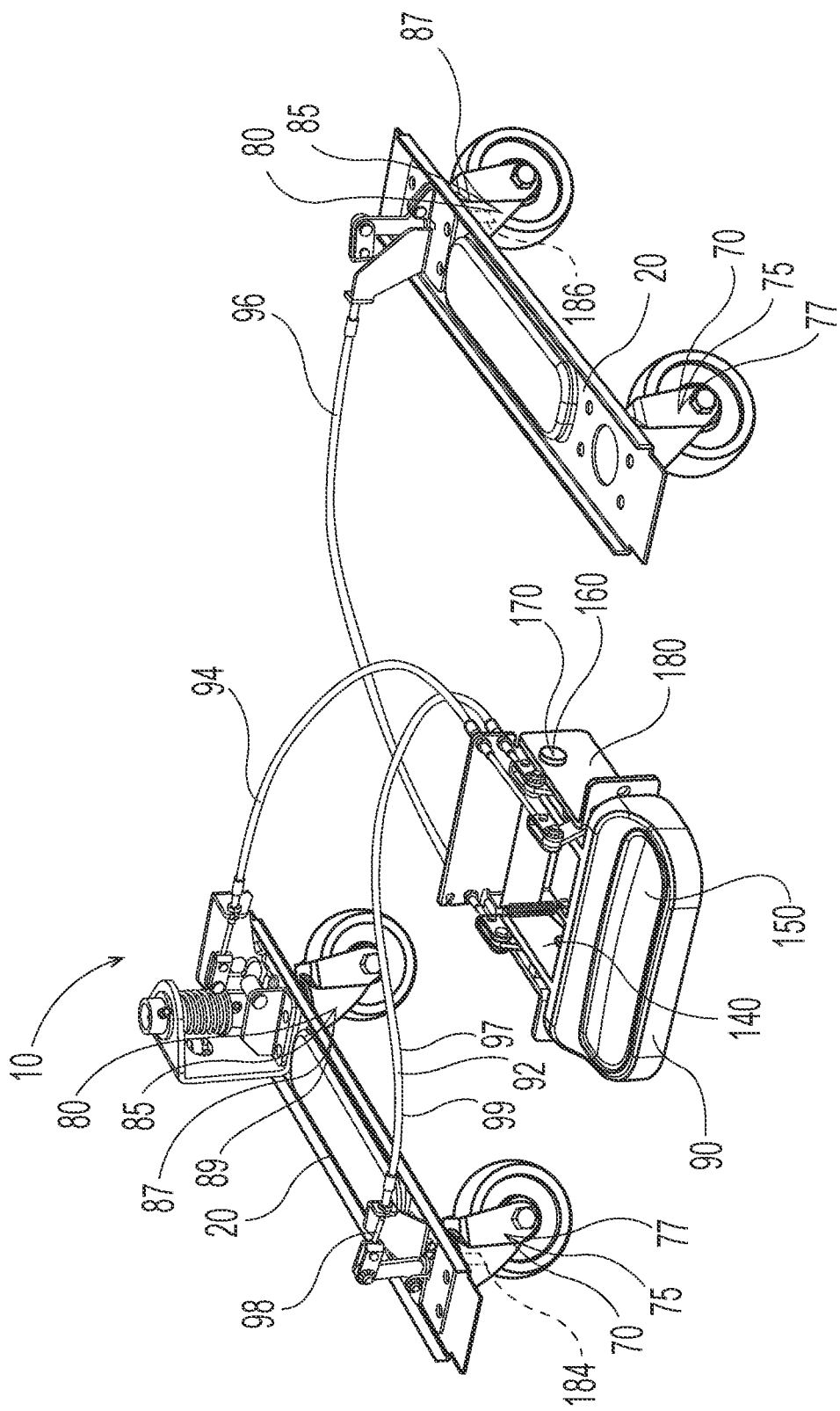
FIG. 2 is an apparatus base shown in a right-side-up position.

A nonlimiting embodiment of an apparatus base 10 is shown in FIG. 2. The apparatus base 10 is shown in an upright position in FIG. 2. The actuator 90 can be a lever 140. A lever 140 is a simple machine that can transform a small user applied force into a larger force that can manipulate a mechanism or object. For ergonomic simplicity, the lever 140 can be positioned elevationally below the tub 40. By elevationally below, it is meant that the lever 140 can be lower than the tub 40. For example, the lever 140 can be at, proximal to, or beneath, the apparatus base 10. Such a position enables the user to operate the actuator 90 with his or her foot. And the weight of the laundry treatment apparatus 1 can provide a reaction force so that the laundry treatment apparatus 1 is stable with the lever 140 is actuated.

The lever 140 can be positioned beneath the door 120 to the tub 40. This can be desirable since, in use, the user may place the laundry treatment apparatus against a wall or cabinet in a manner so that the door 120 is accessible to the user. Positioning the lever 140 beneath the door 120 will permit easy access to both the door 120 and lever 140 during use of the laundry treatment apparatus 1. Optionally, the lever 140 can be recessed relative to the front face 110. This can help reduce the potential for the user to unintentionally actuate the lever 140.

A foot pedal 150 can be attached to the lever 140. The foot pedal 150 can be sized and dimensioned to manipulatable by an adult human foot. The foot pedal 150 can have a bearing surface having an area from about 25 cm² to about 400 cm², optionally from about 100 cm² to about 200 cm². The bearing area of the foot pedal 150 is the surface of the lever 140 that the user is intended to push upon to operate the lever. A foot actuated lever 140 can be desirable since the user can generate appreciable force to operate the actuator 90 by pushing down with his or her foot.

The lever 140 can be moveable about a fulcrum 160. The fulcrum 160 can be one or more pins 170 connecting the lever 140 with a resistance frame 180. The lever 140 can be moved from the first position to the second position by pushing on the lever 140 to swing the lever towards a floor upon which the first pair 70 of first swivel casters 75 and second pair 80 of second swivel casters 85 rests. By transitioning the actuator 90 from the first position to the second position, the first rolling brake and second rolling brake are transitioned from the unbraked condition to the braked condition and the lock of the vertically adjustable swivel caster 89 is transitioned from the unlocked condition to the locked condition. A foot operated lever 140 is practical in that a user can generate appreciable force with his or her foot that the lever 140 can multiply to apply a substantial braking force in the braked swivel casters and activate the lock of the vertically adjustable swivel caster 89.

Figure 3:
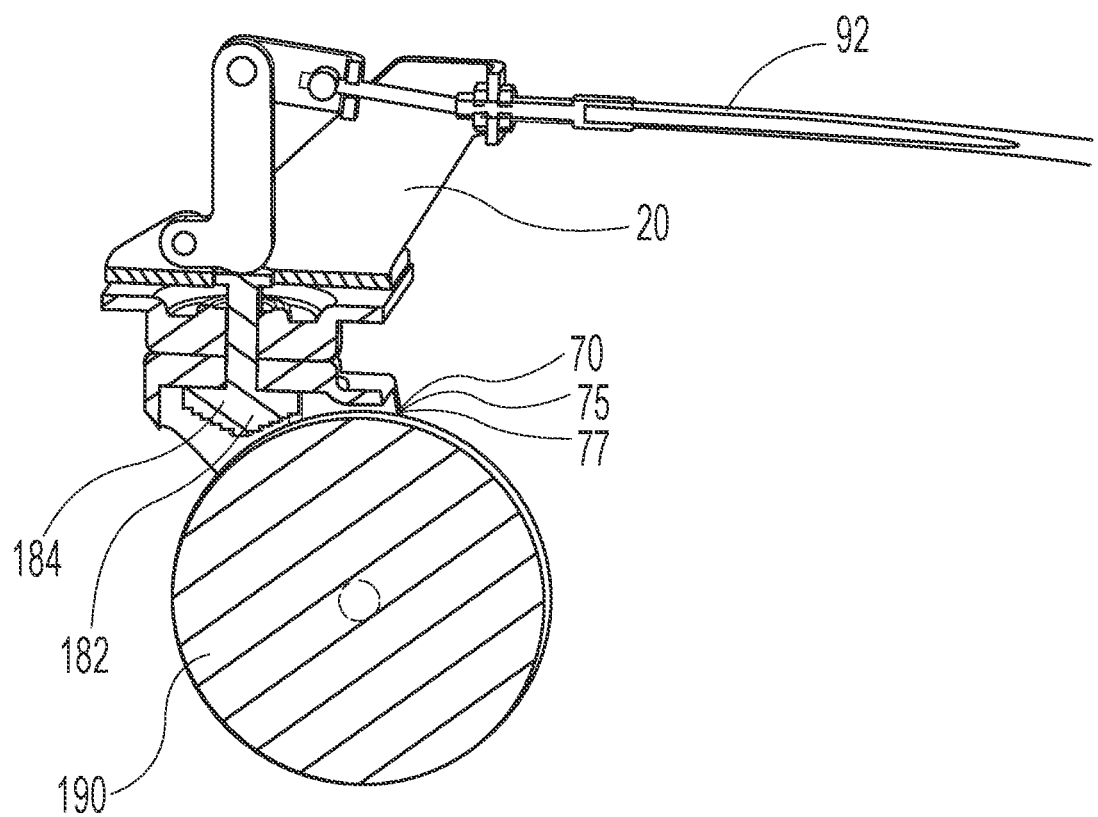
FIG. 3 is a braked swivel caster.

The braked first swivel caster 77 and braked second swivel caster 87 can each have a first rolling brake 184 and second rolling brake 186, respectively. A swivel caster having a rolling brake 182 is shown if FIG. 3. The terms first rolling brake 184 and second rolling brake 186 are used for convenience to establish that the respective swivel caster has a rolling brake 182. The rolling brake 182 can brake the wheel 190 of the swivel caster. The rolling brake 182 can be within the hub of the wheel 190, for example as an internal drum rolling brake 182. Optionally the rolling brake 182 can apply breaking force to the external surface of the wheel 190, for example by direct contact between the rolling brake 182 and the rolling surface of the wheel 190. The respective rolling brake 184, 186 can be actuated by the actuator 90 via the respective linkage that connects the actuator 90 to the respective rolling brake 184, 186. Optionally, multiple actuators 90 can be provided so that each rolling brake 182 can be activated independent of the other, and possibly independent of the lock.

Figure 4:
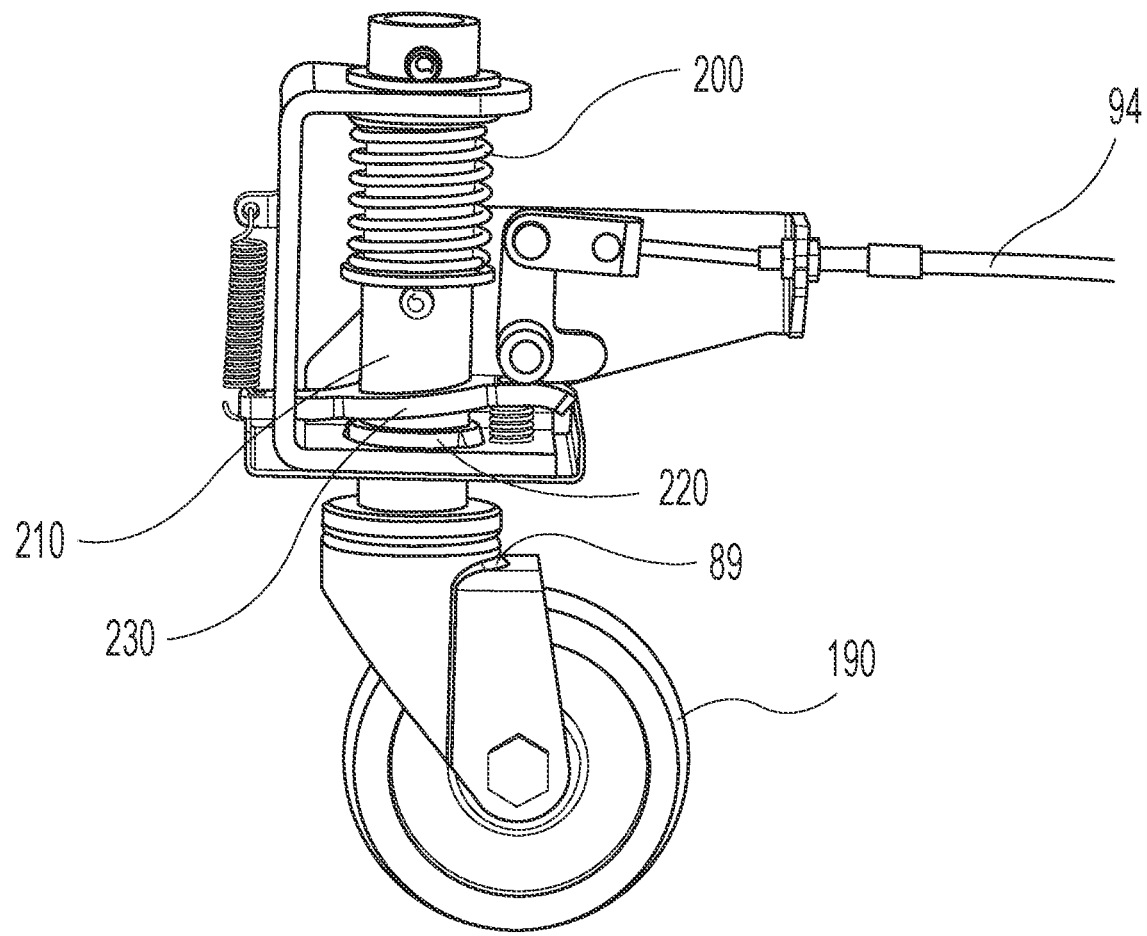
FIG. 4 is a vertically adjustable swivel caster.

The vertically adjustable swivel caster 89 can be a spring loaded vertically adjustable swivel caster 89, by way of nonlimiting example as shown in FIG. 4. Such swivel casters permit the wheel 190 to vary in vertical position relative to the apparatus base 10. The spring 200 within such a swivel caster provides an active force that forces the wheel 190 into contact with the floor. In particular, the spring 200 can be preloaded to exert a force in a direction away from the apparatus base 10. Preloading can be applied, by way of nonlimiting example, by precompressing the spring 200 so that when all of the swivel casters of the laundry treatment apparatus 1 are unsupported by a surface, the vertically adjustable swivel caster 89 projects further away from the apparatus base 10 than the other swivel casters. The spring 200 can be set up so that when the spring loaded swivel caster 89 is in plane with the other swivel casters, the force mobilized in the spring 200 is within about 20% of, or even within about 10% of, or even within about 5% of, or even equal to, one fourth of the weight of the laundry treatment apparatus 1. Precompressing the spring 200 allows the vertically adjustable swivel caster 89 to be moveable both up and down as needed to ensure that all four swivel casters end up firmly resting on the floor so that the laundry treatment apparatus 1 is stable during use.

When the user moves the laundry treatment apparatus 1 about his or her dwelling, the first pair 70 of first swivel casters 75 and the second pair 80 of the second swivel casters 85 will support the apparatus base 10 and roll freely on the floor. Once the laundry treatment apparatus 1 is positioned where desired, the first pair 70 of swivel casters and one of the second swivel casters 80 other than the vertically adjustable swivel casters 89 define a plane upon which the apparatus base 10 rests and the vertically adjustable swivel caster 89 supports the plane. The actuator can then be actuated to lock the vertical position of the vertically adjustable swivel caster 89 and apply the rolling brakes 184, 186 to the braked first swivel caster 77 and the braked second swivel caster 87.

The spring loaded vertical swivel caster 89 can comprise a stem 210 slidably engaged with a bushing 220. The stem 210 can be movable towards and away from the apparatus base 10. The lock 230 can be engageable with the stem 210. A stem 210 moveable towards and away from the apparatus base 10 can guide movement of the wheel 190 towards and away from the apparatus base 10. The lock 230 can mechanically engage with the stem 210 to restrain movement of the stem 210 to fix the position of the wheel 190 relative to the apparatus base 10. Furthermore, the lock 230 can restrain the stem 210 from swivel movement. For example, as shown in FIG. 4, the lock 230 restrains the rotational degree of freedom of the stem 210 and the axial displacement of the stem 210. The wheel 190 can be directly in line with the stem 210. Optionally, the wheel 190 can be indirectly engaged with the stem 210 via a rocker.

Combinations

An example is below:

A. A laundry treatment apparatus (1) comprising:
an apparatus base (10) having four corners (15);
a tub (40) defining a fluid containment envelope (50), wherein said tub is above said apparatus base;
a drum (60) positioned within the tub and rotatable relative to the tub about an axis of rotation (AR) that is within about 20 degrees of horizontal relative to said apparatus base;
a first pair (70) of first swivel casters (75) operably engaged with said apparatus base,
wherein each first swivel caster operably supports one of said four corners;
a second pair (80) of second swivel casters (85) opposite said first pair and operably engaged with said apparatus base, wherein each said second swivel caster supports one of said four corners independent of said first swivel casters;
wherein one of said first swivel casters is a braked first swivel caster (77) having a first rolling brake (184);
wherein one of said second swivel casters is a braked second swivel caster (87) having a second rolling brake (186);
wherein one of said second swivel casters other than said braked second swivel caster is a vertically adjustable swivel caster (89) wherein a wheel (190) of said vertically adjustable swivel caster is movable in a direction towards and away from said apparatus base;
wherein said vertically adjustable swivel caster comprises a lock (230) engageable to restrain movement of said vertically adjustable swivel caster in a direction towards and away from said apparatus base;

wherein said first rolling brake is operably engaged to an actuator (90) by a first linkage (92), said second rolling brake is connected to said actuator by a second linkage (94), and said lock is connected to said actuator by a third linkage (96);

wherein said first linkage, said second linkage, and said third linkage each have a first position in which said first rolling brake and said second rolling brake are unbraked and said lock is unlocked; and wherein said first linkage, said second linkage, and said third linkage each have a second position in which said first rolling brake and said second rolling brake are braked and said lock is locked to restrain movement of said vertically adjustable swivel caster in a direction towards and away from said apparatus base;

wherein said first pair of swivel casters and one of said second swivel casters other than said vertically adjustable swivel caster define a plane upon which said apparatus base rests and said vertically adjustable swivel caster supports said plane.

B. The laundry treatment apparatus according to Paragraph A, wherein said actuator is a lever (140).

C. The laundry treatment apparatus according to Paragraph B, wherein said lever is positioned elevationally below said tub.

D. The laundry treatment apparatus according to Paragraph B or C, wherein said laundry treatment apparatus further comprises a door (120) to said tub, wherein said lever is beneath said door.

E. The laundry treatment apparatus according to any of Paragraphs B to D, wherein said lever comprises a foot pedal (150) sized and dimensioned to be manipulatable by a human foot.

F. The laundry treatment apparatus according to any of Paragraphs B to E, wherein said laundry treatment apparatus has a front face (110) through which said drum is accessed by a user, wherein said lever is recessed relative to said front face.

G. The laundry treatment apparatus according to Paragraph F, wherein said laundry treatment apparatus has a rear face (130) opposing said front face, wherein said vertically adjustable swivel caster is nearer to said rear face than said front face.

H. The laundry treatment apparatus according to any of Paragraphs B to G:
wherein said lever is movable about a fulcrum (160); and
wherein when said lever moves from said first position to said second position said lever swings towards a floor upon which said first pair of said first swivel casters and said second pair of said second swivel casters rests.

I. The laundry treatment apparatus according to any of Paragraphs A to H, wherein said laundry treatment apparatus has a front face (110) through which said drum is accessed by a user and a rear face (130) opposite said front face, wherein said vertically adjustable swivel caster is nearer to said rear face than said front face.

J. The laundry treatment apparatus according to any of Paragraphs A to I, wherein said drum has a volume from about 20 L to about 70 L.

K. The laundry treatment apparatus according to any of Paragraphs A to J, wherein said vertically adjustable swivel caster is a spring loaded vertically adjustable swivel caster.

L. The laundry treatment apparatus according to Paragraph K, wherein said spring loaded vertically adjustable swivel caster comprises a spring (200) preloaded to exert a force in a direction away from said apparatus base.

M. The laundry treatment apparatus according to Paragraph L, wherein said laundry treatment apparatus has a weight, wherein said force is within about 20 percent of one fourth of said weight.

N. The laundry treatment apparatus according to any of Paragraphs K to M, wherein said spring loaded vertically adjustable swivel caster comprises a stem (210) slidably engaged with a bushing (220) and movable towards and away from said apparatus base and said lock is engageable with said stem.

O. The laundry treatment apparatus according to any of Paragraphs A to N, wherein said braked second swivel caster is diagonally opposite said braked first swivel caster.

P. The laundry treatment apparatus according to any of Paragraphs A to O, wherein at least one of said first linkage, said second linkage, and said third linkage is a cable linkage (97).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. A laundry treatment apparatus comprising:
an apparatus base having four corners;
a tub defining a fluid containment envelope, wherein said tub is above said apparatus base;
a drum positioned within the tub and rotatable relative to the tub about an axis of rotation that is within about 20 degrees of horizontal relative to said apparatus base;
a first pair of first swivel casters operably engaged with said apparatus base, wherein each first swivel caster operably supports one of said four corners;
a second pair of second swivel casters opposite said first pair and operably engaged with said apparatus base, wherein each said second swivel caster supports one of said four corners independent of said first swivel casters;
wherein one of said first swivel casters is a braked first swivel caster having a first rolling brake; wherein one of said second swivel casters is a braked second swivel caster having a second rolling brake;
wherein one of said second swivel casters other than said braked second swivel caster is a vertically adjustable swivel caster wherein a wheel of said vertically adjustable swivel caster is movable in a direction towards and away from said apparatus base;
wherein said vertically adjustable swivel caster comprises a lock engageable to restrain movement of said vertically adjustable swivel caster in a direction towards and away from said apparatus base;
wherein said first rolling brake is operably engaged to an actuator by a first linkage, said second rolling brake is connected to said actuator by a second linkage, and said lock is connected to said actuator by a third linkage;
wherein said first linkage, said second linkage, and said third linkage each have a first position in which said first rolling brake and said second rolling brake are unbraked and said lock is unlocked; and
wherein said first linkage, said second linkage, and said third linkage each have a second position in which said first rolling brake and said second rolling brake are braked and said lock is locked to restrain movement of said vertically adjustable swivel caster in a direction towards and away from said apparatus base;

wherein said first pair of swivel casters and one of said second swivel casters other than said vertically adjustable swivel caster define a plane upon which said apparatus base rests and said vertically adjustable swivel caster supports said plane.

2. The laundry treatment apparatus according to claim 1, wherein said actuator is a lever.

3. The laundry treatment apparatus according to claim 2, wherein said lever is positioned elevationally below said tub.

4. The laundry treatment apparatus according to claim 3, wherein said laundry treatment apparatus further comprises a door to said tub, wherein said lever is beneath said door.

5. The laundry treatment apparatus according to claim 4, wherein said lever comprises a foot pedal sized and dimensioned to be manipulatable by a human foot.

6. The laundry treatment apparatus according to claim 5, wherein said laundry treatment apparatus has a front face through which said drum is accessed by a user, wherein said lever is recessed relative to said front face.

7. The laundry treatment apparatus according to claim 6, wherein said laundry treatment apparatus has a rear face opposing said front face, wherein said vertically adjustable swivel caster is nearer to said rear face than said front face.

8. The laundry treatment apparatus according to claim 7:
wherein said lever is movable about a fulcrum; and
wherein when said lever moves from said first position to said second position said lever swings towards a floor upon which said first pair of said first swivel casters and said second pair of said second swivel casters rests.

9. The laundry treatment apparatus according to claim 8, wherein said vertically adjustable swivel caster is a spring loaded vertically adjustable swivel caster.

10. The laundry treatment apparatus according to claim 9, wherein said spring loaded vertically adjustable swivel caster comprises a spring preloaded to exert a force in a direction away from said apparatus base.

11. The laundry treatment apparatus according to claim 10, wherein said laundry treatment apparatus has a weight, wherein said force is within about 20 percent of one fourth of said weight.

12. The laundry treatment apparatus according claim 11, wherein said braked second swivel caster is diagonally opposite said braked first swivel caster.

13. The laundry treatment apparatus according to claim 1, wherein said laundry treatment apparatus has a front face through which said drum is accessed by a user and a rear face opposite said front face, wherein said vertically adjustable swivel caster is nearer to said rear face than said front face.

14. The laundry treatment apparatus according to claim 1, wherein said drum has a volume from about 20 L to about 70 L.

15. The laundry treatment apparatus according to claim 1, wherein said vertically adjustable swivel caster is a spring loaded vertically adjustable swivel caster.

16. The laundry treatment apparatus according to claim 15, wherein said spring loaded vertically adjustable swivel caster comprises a spring preloaded to exert a force in a direction away from said apparatus base.

17. The laundry treatment apparatus according to claim 16, wherein said laundry treatment apparatus has a weight, wherein said force is within about 20 percent of one fourth of said weight.

18. The laundry treatment apparatus according claim 1, wherein said braked second swivel caster is diagonally opposite said braked first swivel caster.

19. The laundry treatment apparatus according to claim 18, wherein said spring loaded vertically adjustable swivel caster comprises a spring preloaded to exert a force in a direction away from said apparatus base.

20. The laundry treatment apparatus according to claim 1, wherein at least one of said first linkage, said second linkage, and said third linkage is a cable linkage.

* * * * *